United States Patent
Hughes et al.

(10) Patent No.: US 11,336,553 B2
(45) Date of Patent: *May 17, 2022

(54) DYNAMIC MONITORING AND VISUALIZATION FOR NETWORK HEALTH CHARACTERISTICS OF NETWORK DEVICE PAIRS

(71) Applicant: HEWLETT PACKARD ENTERPRISE DEVELOPMENT LP, Houston, TX (US)

(72) Inventors: David Anthony Hughes, Los Altos Hills, CA (US); Santosh Bheemarajaiah, Sunnyvale, CA (US); Damon John Ennis, San Jose, CA (US); David Holt Merwin, Redwood City, CA (US); Rolf Muralt, Palo Alto, CA (US); Onur Ozduygu, San Jose, CA (US); Kevin James Roselle, San Jose, CA (US); Pawan Kumar Singh, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,873

(22) Filed: Jul. 24, 2020

(65) Prior Publication Data
US 2020/0358687 A1 Nov. 12, 2020

Related U.S. Application Data

(63) Continuation of application No. 16/224,482, filed on Dec. 18, 2018, now Pat. No. 10,771,370, which is a
(Continued)

(51) Int. Cl.
*H04L 12/26* (2006.01)
*H04L 43/16* (2022.01)
(Continued)

(52) U.S. Cl.
CPC ......... *H04L 43/16* (2013.01); *H04L 41/0631* (2013.01); *H04L 41/22* (2013.01);
(Continued)

(58) Field of Classification Search
None
See application file for complete search history.

(56) References Cited

U.S. PATENT DOCUMENTS

| 4,494,108 A | 1/1985 | Langdon et al. |
| 4,558,302 A | 12/1985 | Welch |

(Continued)

FOREIGN PATENT DOCUMENTS

| EP | 1507353 A2 | 2/2005 |
| JP | 05-061964 A | 3/1993 |
| WO | 01/35226 A1 | 5/2001 |

OTHER PUBLICATIONS

"You L. L. et al., ""Deep Store An Archival Storage System Architecture"" Data Engineering, 2005. ICDE 2005. Proceedings. 21st.inli Conf on Tokyo, Japan, Apr. 5-8, 2005, pp. 12".

(Continued)

*Primary Examiner* — Anh Vu H Ly
(74) *Attorney, Agent, or Firm* — Hewlett Packard Enterprise Patent Department

(57) ABSTRACT

Disclosed is a system and method for the dynamic monitoring of network health characteristics via a visualization platform. The platform receives collected information regarding network health characteristics and applies a rule set defining at least one threshold to classify each of the network health characteristics for each network component over a time period. The classifications can be represented visually on a graphical user interface to a network admin-
(Continued)

istrator, allowing the administrator to quickly discern which aspects of the network are operating properly and which aspects are not.

20 Claims, 15 Drawing Sheets

Related U.S. Application Data continuation of application No. 14/981,814, filed on Dec. 28, 2015, now Pat. No. 10,164,861.

(51) Int. Cl.
*H04L 41/22* (2022.01)
*H04L 43/0829* (2022.01)
*H04L 43/0852* (2022.01)
*H04L 43/087* (2022.01)
*H04L 41/0631* (2022.01)
*H04L 43/0823* (2022.01)
*H04L 41/12* (2022.01)

(52) U.S. Cl.
CPC ........ *H04L 43/087* (2013.01); *H04L 43/0829* (2013.01); *H04L 43/0852* (2013.01); *H04L 41/12* (2013.01); *H04L 43/0847* (2013.01)

(56) References Cited

U.S. PATENT DOCUMENTS

| | | |
|---|---|---|
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Libove et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Somnath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,823,470 B2 | 11/2004 | Smith et al. |
| 6,839,346 B1 | 1/2005 | Kametani |
| 6,842,424 B1 | 1/2005 | Key et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Securest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagarajan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van et al. |
| 7,243,094 B2 | 7/2007 | Tabellion et al. |
| 7,249,309 B2 | 7/2007 | Glaise et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,359,393 B1 | 4/2008 | Nalawade et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,441,039 B2 | 10/2008 | Bhardwaj |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,496,659 B1 | 2/2009 | Coverdill et al. |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |

(56) References Cited

U.S. PATENT DOCUMENTS

| | | |
|---|---|---|
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |
| 7,624,446 B1 | 11/2009 | Wilhelm |
| 7,630,295 B2 | 12/2009 | Hughes et al. |
| 7,633,942 B2 | 12/2009 | Bearden et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |
| 7,793,193 B2 | 9/2010 | Koch et al. |
| 7,810,155 B1 | 10/2010 | Ravi |
| 7,826,798 B2 | 11/2010 | Stephens et al. |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,924,795 B2 | 4/2011 | Wan et al. |
| 7,925,711 B1 | 4/2011 | Gopalan et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,957,307 B2 | 6/2011 | Qiu et al. |
| 7,970,898 B2 | 6/2011 | Clubb et al. |
| 7,975,018 B2 | 7/2011 | Unrau et al. |
| 7,996,747 B2 | 8/2011 | Dell et al. |
| 8,046,667 B2 | 10/2011 | Boyce |
| 8,069,225 B2 | 11/2011 | McCanne et al. |
| 8,072,985 B2 | 12/2011 | Golan et al. |
| 8,090,027 B2 | 1/2012 | Schneider |
| 8,090,805 B1 | 1/2012 | Chawla et al. |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,271,847 B2 | 9/2012 | Langner |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,553,757 B2 | 10/2013 | Florencio et al. |
| 8,565,118 B2 | 10/2013 | Shukla et al. |
| 8,570,869 B2 | 10/2013 | Ojala et al. |
| 8,576,816 B2 | 11/2013 | Lamy-Bergot et al. |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 | 4/2014 | Zheng et al. |
| 8,700,771 B1 | 4/2014 | Ramankutty et al. |
| 8,706,947 B1 | 4/2014 | Pradeep |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,775,413 B2 | 7/2014 | Brown et al. |
| 8,811,431 B2 | 8/2014 | Hughes |
| 8,843,627 B1 | 9/2014 | Baldi et al. |
| 8,850,324 B2 | 9/2014 | Clemm et al. |
| 8,885,632 B2 | 11/2014 | Hughes et al. |
| 8,891,554 B2 | 11/2014 | Biehler |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,106,530 B1 | 8/2015 | Wang |
| 9,130,991 B2 | 9/2015 | Hughes |
| 9,131,510 B2 | 9/2015 | Wang |
| 9,143,455 B1 | 9/2015 | Hughes |
| 9,152,574 B2 | 10/2015 | Hughes et al. |
| 9,171,251 B2 | 10/2015 | Camp et al. |
| 9,191,342 B2 | 11/2015 | Hughes et al. |
| 9,202,304 B1 | 12/2015 | Baenziger et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,248 B1 | 6/2016 | Hughes |
| 9,363,309 B2 | 6/2016 | Hughes |
| 9,380,094 B2 | 6/2016 | Florencio et al. |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B1 | 4/2017 | Hughes |
| 9,626,224 B2 | 4/2017 | Hughes et al. |
| 9,647,949 B2 | 5/2017 | Varki et al. |
| 9,712,463 B1 | 7/2017 | Hughes et al. |
| 9,716,644 B2 | 7/2017 | Wei et al. |
| 9,717,021 B2 | 7/2017 | Hughes et al. |
| 9,875,344 B1 | 1/2018 | Hughes et al. |
| 9,906,630 B2 | 2/2018 | Hughes |
| 9,948,496 B1 | 4/2018 | Hughes et al. |
| 9,961,010 B2 | 5/2018 | Hughes et al. |
| 9,967,056 B1 | 5/2018 | Hughes |
| 10,091,172 B1 | 10/2018 | Hughes |
| 10,164,861 B2 | 12/2018 | Hughes et al. |
| 10,257,082 B2 | 4/2019 | Hughes |
| 10,313,930 B2 | 6/2019 | Hughes et al. |
| 10,326,551 B2 | 6/2019 | Hughes |
| 10,432,484 B2 | 10/2019 | Hughes et al. |
| 10,637,721 B2 | 4/2020 | Hughes et al. |
| 10,719,588 B2 | 7/2020 | Hughes et al. |
| 10,771,370 B2 * | 9/2020 | Hughes ............... H04L 43/0852 |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0009079 A1 | 1/2002 | Jungck et al. |
| 2002/0010702 A1 | 1/2002 | Ajtai et al. |
| 2002/0010765 A1 | 1/2002 | Border |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Nanjundiah |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0159454 A1 | 10/2002 | Delmas |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | Mcauliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |

(56) References Cited

U.S. PATENT DOCUMENTS

| | | |
|---|---|---|
| 2003/0048785 A1 | 3/2003 | Calvignac et al. |
| 2003/0067940 A1 | 4/2003 | Edholm |
| 2003/0086425 A1* | 5/2003 | Bearden ............. H04M 3/2236 370/392 |
| 2003/0091165 A1* | 5/2003 | Bearden ................. H04L 41/22 379/88.08 |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1 | 5/2004 | Wang et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer et al. |
| 2005/0055399 A1 | 3/2005 | Savchuk |
| 2005/0060598 A1* | 3/2005 | Klotz .................. G06F 11/2257 714/4.2 |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Securest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | Duree |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0109805 A1 | 5/2006 | Malamal et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | Van et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0076708 A1 | 4/2007 | Kolakowski et al. |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De et al. |
| 2007/0160200 A1 | 7/2007 | Ishikawa et al. |
| 2007/0174428 A1 | 7/2007 | Lev et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0260746 A1 | 11/2007 | Mirtorabi et al. |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardeizky et al. |
| 2008/0267217 A1 | 10/2008 | Colville et al. |
| 2008/0285463 A1 | 11/2008 | Oran |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar et al. |
| 2009/0175172 A1 | 7/2009 | Prytz et al. |

(56) References Cited

U.S. PATENT DOCUMENTS

| | | |
|---|---|---|
| 2009/0182864 A1 | 7/2009 | Khan et al. |
| 2009/0204961 A1 | 8/2009 | Dehaan et al. |
| 2009/0234966 A1 | 9/2009 | Samuels et al. |
| 2009/0245114 A1 | 10/2009 | Jayanth |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | Van et al. |
| 2011/0113472 A1 | 5/2011 | Fung et al. |
| 2011/0131411 A1 | 6/2011 | Lin et al. |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1 | 2/2012 | Mashtizadeh et al. |
| 2012/0069131 A1 | 3/2012 | Abelow |
| 2012/0147894 A1 | 6/2012 | Mulligan et al. |
| 2012/0173759 A1 | 7/2012 | Agarwal et al. |
| 2012/0185775 A1 | 7/2012 | Clemm et al. |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez et al. |
| 2013/0086236 A1 | 4/2013 | Baucke et al. |
| 2013/0086594 A1 | 4/2013 | Cottrell |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0266007 A1 | 10/2013 | Kumbhare et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | Van et al. |
| 2014/0075554 A1 | 3/2014 | Cooley |
| 2014/0086069 A1 | 3/2014 | Frey et al. |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1 | 9/2014 | Decusatis et al. |
| 2014/0279078 A1 | 9/2014 | Nukala et al. |
| 2014/0321290 A1 | 10/2014 | Jin et al. |
| 2014/0379937 A1 | 12/2014 | Hughes et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0110113 A1 | 4/2015 | Levy et al. |
| 2015/0120663 A1 | 4/2015 | Le et al. |
| 2015/0127701 A1 | 5/2015 | Chu et al. |
| 2015/0143505 A1 | 5/2015 | Border et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0334210 A1 | 11/2015 | Hughes |
| 2015/0365293 A1 | 12/2015 | Madrigal et al. |
| 2016/0014051 A1 | 1/2016 | Hughes et al. |
| 2016/0034305 A1 | 2/2016 | Shear et al. |
| 2016/0093193 A1 | 3/2016 | Silvers et al. |
| 2016/0112255 A1 | 4/2016 | Li |
| 2016/0218947 A1 | 7/2016 | Hughes et al. |
| 2016/0255000 A1 | 9/2016 | Gattani et al. |
| 2016/0255542 A1 | 9/2016 | Hughes et al. |
| 2016/0359740 A1 | 12/2016 | Parandehgheibi et al. |
| 2016/0380886 A1 | 12/2016 | Blair et al. |
| 2017/0026467 A1 | 1/2017 | Barsness et al. |
| 2017/0070445 A1 | 3/2017 | Zhang et al. |
| 2017/0111692 A1 | 4/2017 | An et al. |
| 2017/0149679 A1 | 5/2017 | Hughes et al. |
| 2017/0187581 A1 | 6/2017 | Hughes et al. |
| 2017/0359238 A1 | 12/2017 | Hughes et al. |
| 2018/0089994 A1 | 3/2018 | Dhondse et al. |
| 2018/0121634 A1 | 5/2018 | Hughes et al. |
| 2018/0123861 A1 | 5/2018 | Hughes et al. |
| 2018/0131711 A1 | 5/2018 | Chen et al. |
| 2018/0205494 A1 | 7/2018 | Hughes |
| 2018/0227216 A1 | 8/2018 | Hughes |
| 2018/0227223 A1 | 8/2018 | Hughes |
| 2019/0089620 A1 | 3/2019 | Hefel et al. |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1 | 8/2019 | Wu et al. |
| 2019/0253187 A1 | 8/2019 | Hughes |
| 2019/0260683 A1 | 8/2019 | Hughes |
| 2019/0274070 A1 | 9/2019 | Hughes et al. |
| 2019/0280917 A1 | 9/2019 | Hughes et al. |
| 2020/0021506 A1 | 1/2020 | Hughes et al. |
| 2020/0213185 A1 | 7/2020 | Hughes et al. |

OTHER PUBLICATIONS

"You, L. L. and Karamanolis, C. 2004. ""Evaluation of effcient archival storage techniques""", In Proceedings of the 21st IEEE Symposium on Mass Storage Systems and Technologies (MSST)".
A protocol-independent technique for eliminating redundant network traffic, ACM SIGCOMM Computer CommunicationReview, vol. 30, Issue 4 (Oct. 2000) pp. 87-95, Year of Publication: 2000.
Definition appliance, 2c, Webster's Third New International Dictionary, Unabridged (1993), available at <http://lionreference.chadwyck.com> (Dictionaries/Webster's Dictionary). Copy not provided in proceedings.
Final Written Decision, dated Dec. 30, 2014, Inter Parles Review Case No. IR2013-00402, pp. 1-37.
Final Written Decision, dated Dec. 30, 2014, Inter Partes Review Case No. IPR2013-00403.

(56) References Cited

OTHER PUBLICATIONS

Final Written Decision, dated Jun. 9, 2015, Inter Partes Review Case No. IPR2014-00245.
Hong, B et al. "Duplicate data elimination in a SAN file system", In Proceedings of the 21st Symposium on Mass Storage Systems (M88 '04), Goddard, MD, Apr. 2004. IEEE.
Knutsson, Bjorn et al., "Transparent Proxy Signalling", Journal of Communications and Networks, vol. 3, No. 2, Jun. 2001.
Newton, "Newton's Telecom Dictionary", 17th Ed., 2001, pp. 38, 201, and 714.
Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)), 2 pages.
Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)).
Shared LAN Cache Datasheel, 1996, http://www.lancache.com/slcdata.htm.
Silver Peak Systems, "The Benefits of Byte-level WAN Deduplication" (2008).
Singh et al.; "Future of Internet Security—IPSEC"; 2005; pp. 1-8.
Tseng, Josh, "When accelerating secure traffic is not secure" (available at http://www.riverbed.com/blogs/whenaccelerati.hlml?&isSearch=true&pageSize=3&page=2 (last visited Aug. 8, 2014)).
Zhao et al.; "Analysis and Improvement on IPSEC Anti-Replay Window Protocol"; 2003; IEEE' pp. 553-558
"Decision Granting Motion to Terminate", Inter Partes Review Case No. IPR2014-00245, Feb. 7, 2018, 4 pages.
"Fred Douglis and Arun Iyengar, Application specific Delta-encoding via Resemblance Detection", Published in the 2003 USENIX Annual Technical Conference.
"IPsec Anti-Replay Window: Expanding and Disabling," Cisco IOS Security Configuration Guide. 2005-2006 Cisco Systems, Inc. Last updated: Sep. 12, 2006, 14 pages.
"Muthitacharoen, Athicha et al., ""A Low-bandwidth Network File System,"" 2001, in Proc. ofthe 18th ACM Symposium on Operating Systems Principles, Banff, Canada, pp. 174-187."
"Notice of Entry of Judgement Accompanied by Opinion", United States Court of Appeals for the Federal Circuit, Case: 15-2072, Oct. 24, 2017, 6 pages.
"Udi Manber. ""Finding Similar Files in a Large File System""", TR 93-33 Oct. 1994, Department of Computer Science,University of Arizona. http://webglimpse.net/pubs/TR93-33.pdf. Also appears in the 1994 winter USENIX Technical Conference.".

\* cited by examiner

| Devices |
|---|
| 320A |
| 320B |
| 320C |
| 320D |

| Pairs |
|---|
| 320A - 320B |
| 320A - 320C |
| 320A - 320D |
| 320B - 320C |
| 320B - 320D |
| 320C - 320D |

| Pair | Tunnel | Monday | Tuesday | Wednesday |
|---|---|---|---|---|
| 320A - 320B | 330a1 | G | G | G |
| | 330a2 | G | G | Y |
| | 330a3 | G | R | G |
| 320B - 320D | 330b1 | G | G | G |
| | 330b2 | G | G | G |

FIG. 3E

| Pair | Monday | Tuesday | Wednesday |
|---|---|---|---|
| 320A - 320B | G | R | Y |
| 320B - 320D | G | G | G |

FIG. 3F

| Device | Monday | Tuesday | Wednesday |
|---|---|---|---|
| 320A | G | R | Y |
| 320B | G | R | Y |
| 320C | G | G | G |
| 320D | G | G | G |

FIG. 3G

| Loss | | | | |
|---|---|---|---|---|
| Device | Day 1 | Day 2 | Day 3 | Day 4 |
| Device 1 | G | G | R | G |
| Device 2 | G | G | G | G |
| Device 3 | Y | Y | Y | G |
| Device 4 | G | G | G | R |

FIG. 13A

| Jitter | | | | |
|---|---|---|---|---|
| Device | Day 1 | Day 2 | Day 3 | Day 4 |
| Device 1 | G | R | G | G |
| Device 2 | G | G | G | G |
| Device 3 | R | Y | G | G |
| Device 4 | Y | G | G | R |

FIG. 13B

| Loss or Jitter | | | | |
|---|---|---|---|---|
| Device | Day 1 | Day 2 | Day 3 | Day 4 |
| Device 1 | G | R | R | G |
| Device 2 | G | G | G | G |
| Device 3 | R | Y | Y | G |
| Device 4 | Y | G | G | R |

FIG. 13C

DYNAMIC MONITORING AND VISUALIZATION FOR NETWORK HEALTH CHARACTERISTICS OF NETWORK DEVICE PAIRS

CROSS-REFERENCE TO RELATED APPLICATIONS

The present application is a continuation of, and claims the priority benefit of, U.S. application Ser. No. 16/224,482 filed on Dec. 18, 2018, which in turn is a continuation of and claims the priority benefit of, U.S. application Ser. No. 14/981,814 filed on Dec. 28, 2015, now granted as U.S. Pat. No. 10,164,861 issued on Dec. 25, 2018. The disclosures of the above-referenced patents are hereby incorporated by reference in their entirety, for all purposes.

TECHNICAL FIELD

This disclosure relates generally to a visualization platform for the dynamic monitoring of network components throughout a communication network.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

The proliferation of network devices has become ubiquitous. There are network devices that serve as the backbone of a communications network, such as switches and routers. Also, network devices facilitate access to certain web-based applications, such as load balancers to facilitate access to a service over multiple servers. Furthermore, there are network devices for optimization of data transfer speed or quality across the network, encryption/decryption, etc., and network devices that make up an overlay network. Other types of network devices may also be present in a communication network.

As the number of these devices multiplies rapidly, dynamic monitoring of these devices becomes cumbersome for a human network administrator. Traditionally when a device malfunctioned, the network administrator received an alarm notifying him that a device is not operating properly. However, when there are hundreds or thousands of network devices deployed, having many simultaneous alarms triggered at the same time can be overwhelming and difficult to individually evaluate to discern the problematic activity or cause of the triggered alarms. Furthermore, the longer it takes to diagnose a problem, the longer it takes to fix it, which can result in real cost expenditures until a business can get their systems online again.

Further, there are many paths, both physical and virtual, that data packets can take as they travel through a communications network. The performance of the different paths may continually change based on numerous variables, such as load, physical connectivity, power loss, overheating, bad cables, low memory, software bugs, etc. Monitoring the performance of these paths can be important, especially when trying to find ways to increase network performance across the paths. Also, not all devices can measure characteristics of all of the paths, so there needs to be a way to characterize the performance of each path based on the data available.

Additionally, a provider of an overlay network cannot directly measure the health of core network routers, switches, or other devices, so measuring performance of paths over the network devices is one way to evaluate network performance.

There is a need for a way to characterize and evaluate performance of individual paths and devices within a network, so that a network administrator can quickly discern where a problem exists without sifting through reams of data points. Further, there is a need for a simple visualization platform for a network administrator to view and monitor network performance characteristics of a multitude of deployed network devices, paths, and tunnels across a communications network.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

A monitoring and visualization platform for the dynamic monitoring of network devices deployed in a communication network is disclosed. The network devices may be physical devices, or may consist of specialized software operating on other computing components. In various embodiments, A computer-implemented method for dynamically monitoring and displaying network performance of a plurality of network devices in a communications network via an interactive graphical user interface, the method comprising: receiving a plurality of collected metrics regarding at least one health characteristic for a plurality of network paths over a first period of time, each network path comprising a first network device at a first terminal end of the network path and a second network device at a second terminal end of the network path from the plurality of network devices in the communications network; receiving a selection from a user of a health characteristic from the at least one health characteristic to analyze for a second period of time, wherein the second period of time is a multiple of the first period of time; applying a first rule set defining at least one threshold to assign an aggregate first classification for each first network device and second network device pair associated with the plurality of network paths over the second period of time; and displaying to the user the aggregate first classification for each first network device and second network device pair via a selectable object on an interactive graphical user interface, wherein one selectable object of the interactive graphical user interface represents an aggregate network performance for all network paths utilizing the first network device and second network device pair, based on the collected metrics for the plurality of network paths over the first period of time.

In other embodiments, a system for dynamically monitoring and displaying network performance of a plurality of network devices in a communications network via an interactive graphical user interface, the system comprising: a network interface; one or more data storage devices; one or more processors communicably coupled to the network interface and the data storage devices; and a non-transitory computer-readable medium encoded with a computer program communicably coupled to the one or more processors to: receive a plurality of collected metrics regarding at least one health characteristic for a plurality of network paths over a first period of time, each network path comprising a first network device at a first terminal end of the network path and a second network device at a second terminal end of the network path, from the plurality of network devices in the communications network; receive a selection from a user of a health characteristic from the at least one health characteristic to analyze for a second period of time, wherein the second period of time is a multiple of the first period of time; apply a first rule set defining at least one threshold to assign an aggregate first classification for each first network device and second network device pair associated with the plurality of network paths over the second period of time; and display to the user the aggregate first classification for each first network device and second network device pair via a selectable object on an interactive graphical user interface, wherein one selectable object of the interactive graphical user interface represents an aggregate network performance for all network paths utilizing the first network device and second network device pair, based on the collected metrics for the plurality of network paths over the first period of time.

Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

FIGS. 3E-3G are tables depicting how network characteristics may be classified for different levels of the network.

FIG. 13A depicts an exemplary table showing classifications for the loss network characteristic.

FIG. 13B depicts an exemplary table showing classifications for the jitter network characteristic.

FIG. 13C depicts an exemplary aggregate classification for the loss and jitter characteristic combined.

DETAILED DESCRIPTION

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to a classification scheme and visualization platform for the dynamic monitoring of network devices deployed in a communication network.

Figure 1A:
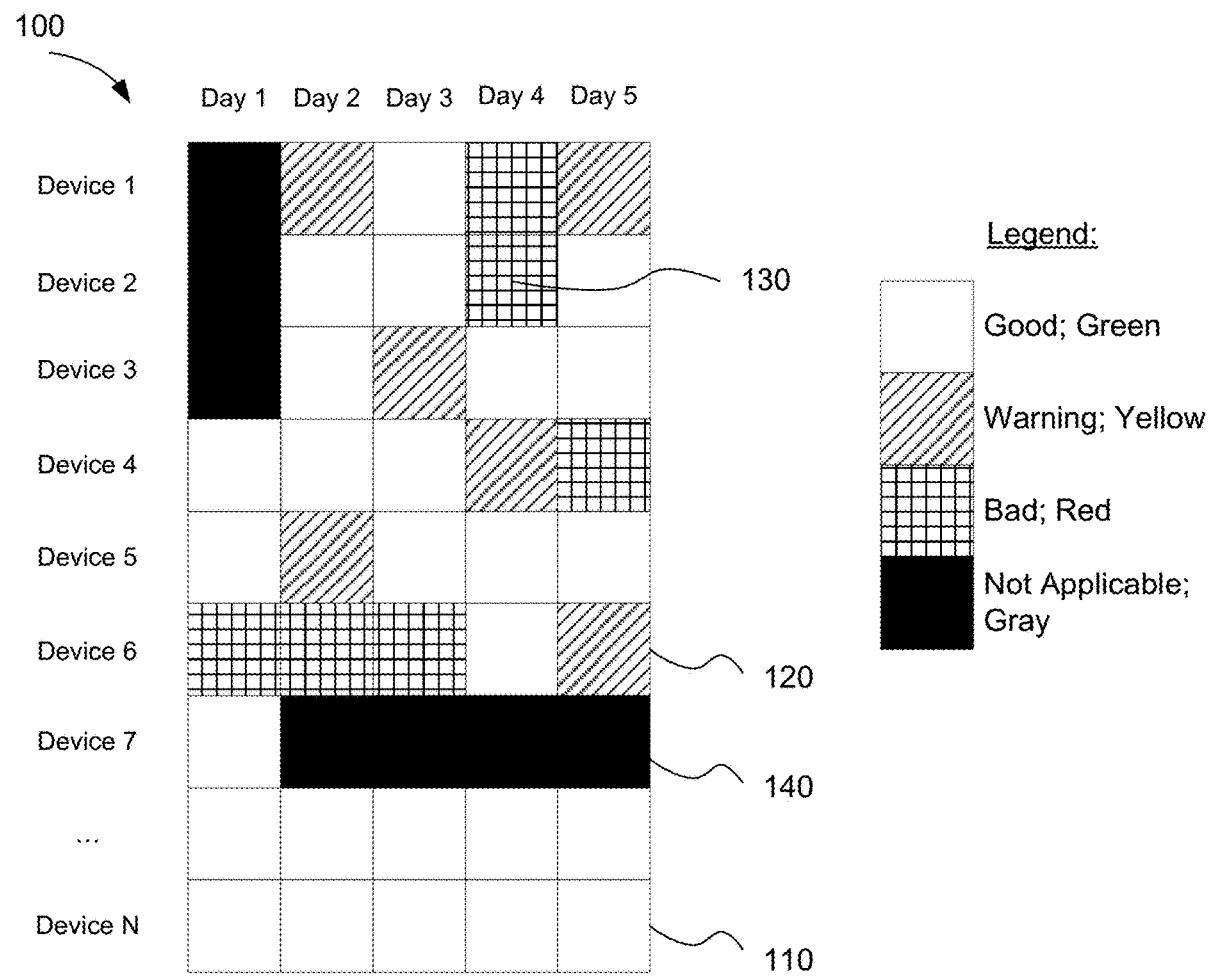
FIG. 1A represents an exemplary grid depicting network health characteristics for a plurality of devices over a plurality of days.

FIG. 1A depicts an exemplary grid 100 depicting network health characteristics for a plurality of devices over a plurality of days. In the exemplary grid 100 of FIG. 1A, the performance of one or more network health characteristics can be displayed, and those network health characteristic(s) can be compared across devices over time to allow a network administrator to compare performance across devices in a network. In various embodiments the devices may be part of an overlay network. Whiles devices 1-N are depicted in FIG. 1A, a network administrator may also compare a network health characteristic over network paths, flows, tunnels, or other network component. While the exemplary grid 100 of FIG. 1A depicts performance of a network health characteristic over days 1-5, any period of time can be displayed. For example, data can be viewed for each device for each minute, hour, day, week, month, year, etc.

In exemplary embodiments, network health characteristic performance can be classified into 4 classifications, with thresholds for each classification. Each of these classifications are represented visually on the grid to allow a network administrator to easily view network performance and know which aspect to investigate further. The classifications may be good, warning, bad, and not applicable. These may be represented by different colors on the grid, such as green for good, yellow for warning, red for bad, and gray for not applicable. In various embodiments, other color schemes may be used to represent each classification. Alternatively, classifications may be represented by different patterns on the grid. In the exemplary grid 100, 110 represents a classification of 'good', 120 represents a classification of 'warning', 130 represents a classification of 'bad', and 140 represents a classification of 'not applicable', 'insufficient data', 'missing data', or the like. While these four classifications are discussed in this exemplary embodiment, fewer or more classifications may be used to represent the data.

As depicted in FIG. 1A, a network administrator can view the grid 100 and see that device N has a classification of 'good' over the 5 day period being analyzed. However, device 6 has a classification of 'good' for day 4 but 'bad' for days 1-3. No other device has a classification of 'bad' for this time period. This indicates to the network administrator that there is a problem with the performance of the particular device, and not a broader problem throughout the network. The network administrator can then investigate the performance of device 6 specifically to pinpoint the problem and rectify it.

In exemplary grid 100, devices 1-2 both have a classification of 'bad' for day 4, but not for the surrounding days 1-3 and 5. This may indicate to the network administrator that there was a problem specific to the region where devices 1-2 are deployed on day 4, instead of a widespread problem throughout the entire network since the other devices are not classified as 'bad' on that day. Further, the problem at devices 1-2 on day 4 was not present because neither device is classified as 'bad' on day 5. The problem may have been fixed or a condition causing the negative performance (like overload) has ceased.

Multiple devices may underperform on a particular day due to a regional problem such as a power outage, or a problem with a communication network at a particular site, or over a particular Internet Service Provider. Multiple devices underperforming across a region at the same time can indicate to the network administrator that the problem lies not with the network devices, but rather with the network or at the site where the device is deployed.

Devices 1-3 all have a classification of 'not applicable' for day 1, but not for the subsequent days 2-5. A classification of 'not applicable' can occur when there is missing or insufficient data. This may indicate to the network administrator that there was a problem specific to the region where devices 1-3 are deployed on day 1 such that network health characteristic data was not received from these devices on day 1, instead of a widespread problem throughout the entire network since devices 4-N are not classified as 'not applicable' on that day. Further, the problem at devices 1-3 was rectified as data was received from these devices on subsequent days 2-5. Alternatively, devices 1-3 may have been purposefully taken offline on day 1 for any reason, and thus it is expected that there will be no network health characteristic performance for these devices on day 1.

The exemplary grid 100 can be used to display any network health characteristic or combination of characteristics that a network administrator may wish to investigate. For example, a grid can be generated for classifying performance of a network device regarding packet loss, packet delay, jitter, memory utilization, path performance, tunnel performance, or any other network health characteristic or combination thereof.

In exemplary embodiments, grid 100 can automatically grow and add an additional column as time passes. For example, after the end of day 5, another column can automatically be added to grid 100 to show the network health characteristic for each device on day 6. In this way, the grid 100 allows a network administrator to dynamically monitor and display network health characteristics of a plurality of network components, in substantially real time.

Each square of grid 100 may further be interactive such that a network administrator can select a square to obtain additional information regarding the network health characteristic for that network component over that time period. For example, the network administrator may select box 130 to see why device 2 was classified as 'bad' on day 4. Selecting box 130 may allow the administrator to see data for that network health characteristic for device 2 throughout day 4, so that the administrator can see whether the characteristic was classified as bad for device 2 throughout the entire day or for portions of the day. Selecting box 130 then allows the administrator to view another grid for a smaller time segment for a particular network component, such as that shown in FIG. 6. The administrator can then see if day 4 was classified as 'bad' because of one unusual hour, or if it was bad for a significant portion of the day.

Figure 5A:
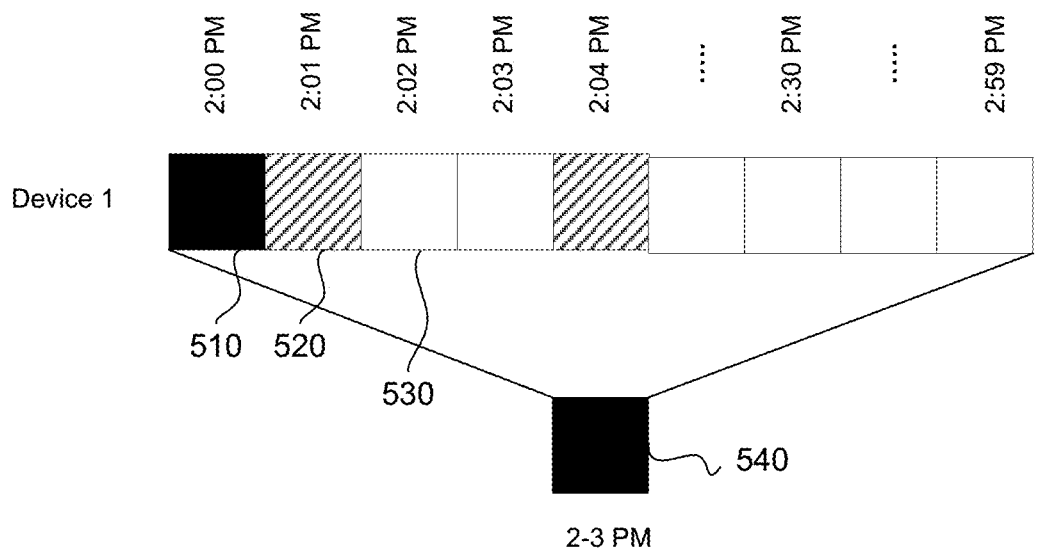
FIG. 5A depicts an exemplary embodiment for a network health characteristic for a device.
Figure 6:
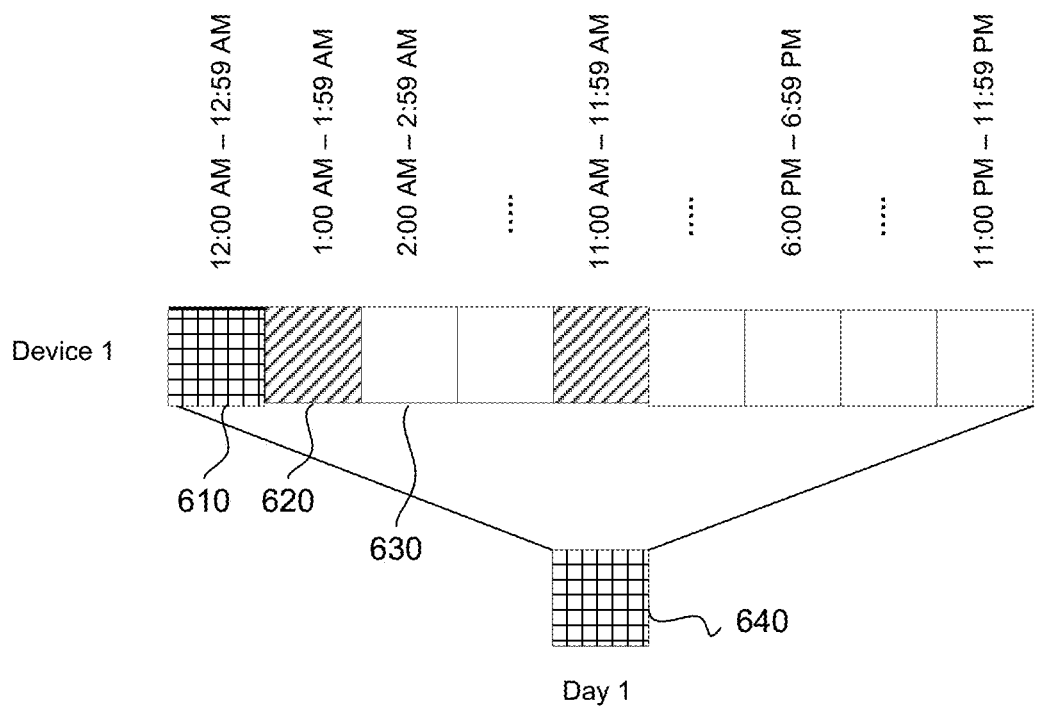
FIG. 6 represents an exemplary aggregate classification determination for a device.

The administrator can further select an individual box, such as box 610 of FIG. 6 to view the classifications for a smaller time period, such as minute data represented by FIG. 5A. In this way, the administrator can keep viewing more discrete time segments as needed to help diagnose any issues that may be present in the network component. Further, the administrator may be able to view a time series plot, such as exemplary plot 800 of FIG. 8 to view the origins of the classifications. By graphically viewing classifications, the administrator can more quickly and easily ascertain where any problems are present in the network without having to sort through reams of collected numerical value data, and attempt to comprehend what that data means for network performance. This analysis can be presented for any network health characteristic(s) for any network component, or network paths and combinations thereof.

Figure 1B:
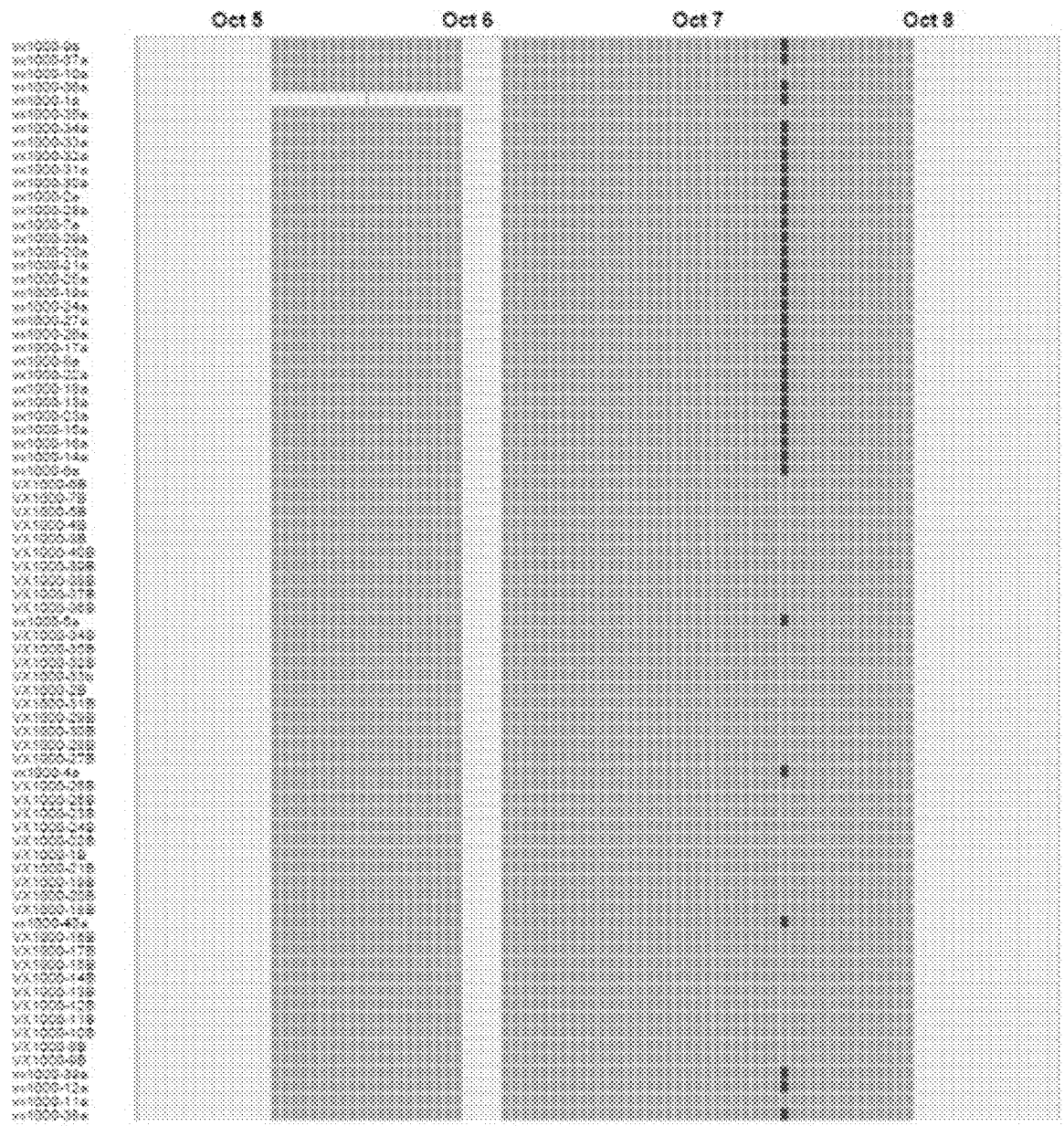
FIG. 1B represents an exemplary screenshot of a graphical user interface displaying an exemplary grid such as grid of FIG. 1A.

FIG. 1B represents an exemplary screenshot of a graphical user interface displaying an exemplary grid such as grid 100 discussed above.

Figure 2:
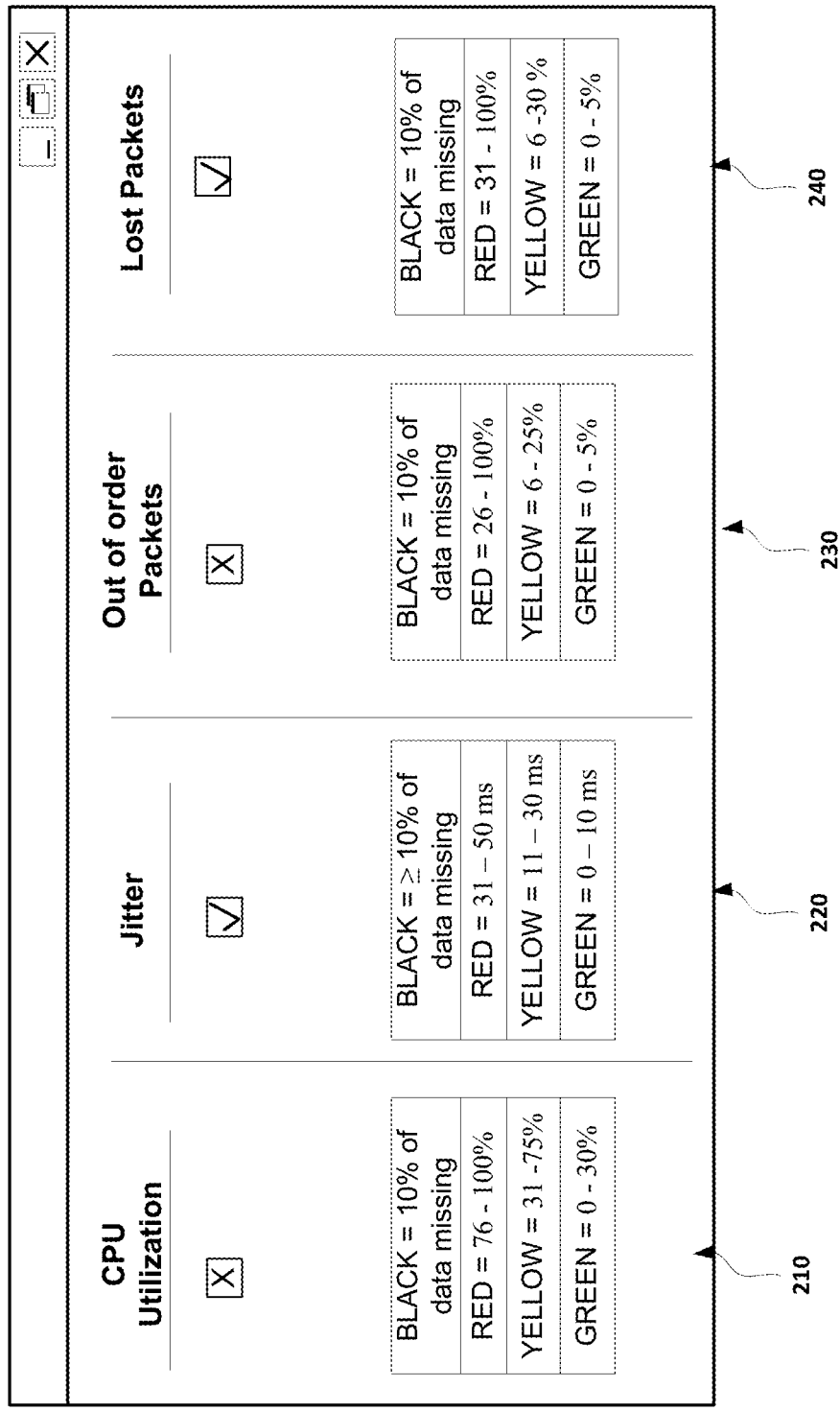
FIG. 2 represents an exemplary graphical user interface for a network administrator to select which network health characteristics to view in the grid format.

FIG. 2 represents an exemplary graphical user interface 200 for a network administrator to select which network health characteristics to view in the grid format. The exemplary GUI 200 depicts data regarding CPU utilization in column 210, jitter in column 220, out of order packets in column 230, and lost packets in column 240. In the exemplary GUI 200, the network administrator has chosen not to view CPU utilization or out of order packet performance, but has chosen to view a combination of jitter and lost packets across the network devices. Optionally, the thresholds for the classifications of each metric may also be depicted in the GUI 200. For example, a jitter of 0-10 milliseconds (ms) for the packets transmitted may be classified as 'good' or depicted as green on the grid. A jitter of 11-30 ms for the packets transmitted may be classified as 'warning' or depicted as yellow on the grid. A jitter of 31-50 for the packets transmitted may be classified as 'bad' or depicted as red on the grid. Finally, if 10% or more of the data points are missing, then the network health characteristic performance may be classified as 'not applicable' or depicted as black on the grid.

The threshold levels for each classification for each network health characteristic may be automatically set, or may be determined or adjusted by the network administrator. In exemplary embodiments, the classification of 'not applicable' is an optional classification to prevent skewing of averages based on insufficient data or false positives. For example, if packet loss is determined by the ratio of the number of packets dropped compared to the number of packets sent. If a network device sends a million data packets and drops 100 of them, then the loss rate for the network device is 0.1%. This is a low rate and indicates good performance. However, if the network device only sends three packets and loses two of them, the loss rate is 67% which indicates very bad performance by the device. However, the device may not actually have a serious problem and the loss rate looks higher than it actually is due to the fact that there were only three data points. As such, there is not really enough data to make a conclusion. Furthermore, the maximum and minimum points can be very skewed when there is not enough data. For this reason, it is advantageous to have a classification of 'not applicable'.

Figure 3A:
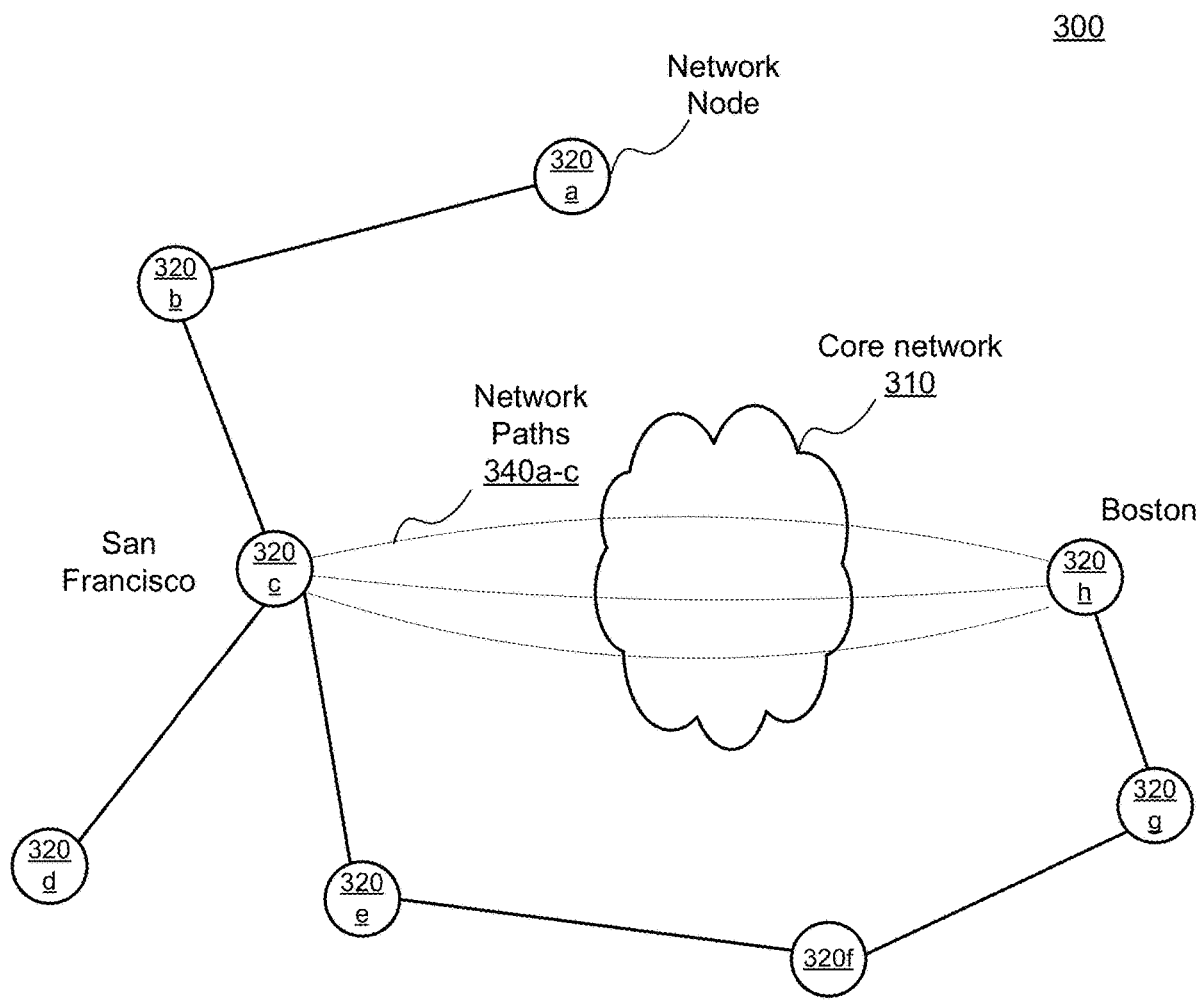
FIG. 3A depicts an exemplary network for which data regarding network health characteristics may be collected, classified, and displayed.

FIG. 3A depicts an exemplary network 300 for which data regarding network health characteristics may be collected, classified, and displayed as discussed herein. The exemplary network 300 contains network nodes 320a-320h. While eight network nodes are depicted in FIG. 3A, there can actually be hundreds or thousands of network nodes deployed throughout a communications network. Although not depicted in the figure, each network node may be connected to every other network node. In FIG. 3A, network node 320c is located in San Francisco, and network node 320h is located in Boston. There can be multiple network paths for data to traverse between the two cities. While three network paths 330a-c are depicted in FIG. 3A, there can actually be hundreds of paths between each node, physical or virtual. Various network path may be managed by different Internet Service Providers. In various embodiments, network paths 330a-c can be physical paths containing routers and switches, or can be virtual paths or tunnels. The paths may be part of an overlay network traversing core network 310, also referred to as an underlay network. Devices may travel over one or more core networks. An overlay network is made up of network paths, and the core network that these paths go over is called the underlay.

In some embodiments, network paths 330a-c may represent tunnels for various devices to communicate with each other, or a mesh of tunnels between devices. There may also be parallel tunnels between each pair of devices, which can result in millions of tunnels throughout the communications network as a whole. Each tunnel may be any type of secure communications channel, such as a Generic Routing Encapsulation (GRE) or Internet Protocol Security (IPsec) tunnel, and facilitates data transfer between network devices, including by traversing firewalls.

In various embodiments, network health characteristic data may be collected for any node, device, path, tunnel, etc. in network 300. For example, packet loss, delay, or jitter information may be collected for data transmitted by any or all of network nodes 320a-320h of FIG. 3A, and/or for data transmitted over any or all of network paths 330a-330c of FIG. 3A. Network health characteristic data can be processed via exemplary processing system 400 of FIG. 4. In the exemplary embodiment depicted in FIG. 4, data from nodes 320a-320d is sent to data collection module 410.

While only four nodes are depicted here, many devices or nodes in the network may send health characteristic data to data collection module 410, including via intervening devices, as would be understood by a person of ordinary skill in the art. Data collection module 410 is in communication with database 420 that organizes and stores the information. Database 420 may consist of one or more databases, tables, or other mechanism for storing and organizing data known in the art. Database 420 may be stored in a local hardware device, or be located in a cloud, or in any other central location accessible to all optimization devices connected to one another via an overlay network. Additionally, information from data collection module 410 may be maintained in other data structures other than a database, as understood by a person of ordinary skill in the art. Further, multiple computers may be used for each module to make the system scalable, especially for database 420 and data collection module 410. There can be multiple collection modules arranged hierarchically.

Database 420 is further in communication with aggregation module 430. Aggregation module 430 may analyze data from database 420 and apply one or more rule sets to the data to determine one or more classifications. For example, data may be collected on a per minute basis and aggregation module may distill the information to a different time period, such as per hour, per day, per month, etc. Optionally, data collection module 410 may perform the data analysis and aggregation operations.

The aggregated data may then be communicated back to database 420 for storage, which in turn communicates with visualization module 440 to generate the one or more grids and graphical user interface(s) to display to a network administrator over a user interface. In exemplary embodiments, the user interface is a web page on an internet or intranet. Aggregation module 430 may collect information regarding network health characteristics and apply a rule set to classify a particular characteristic over a particular period of time. In some embodiments, visualization module 440 can communicate directly with aggregation module 430.

Figure 4:
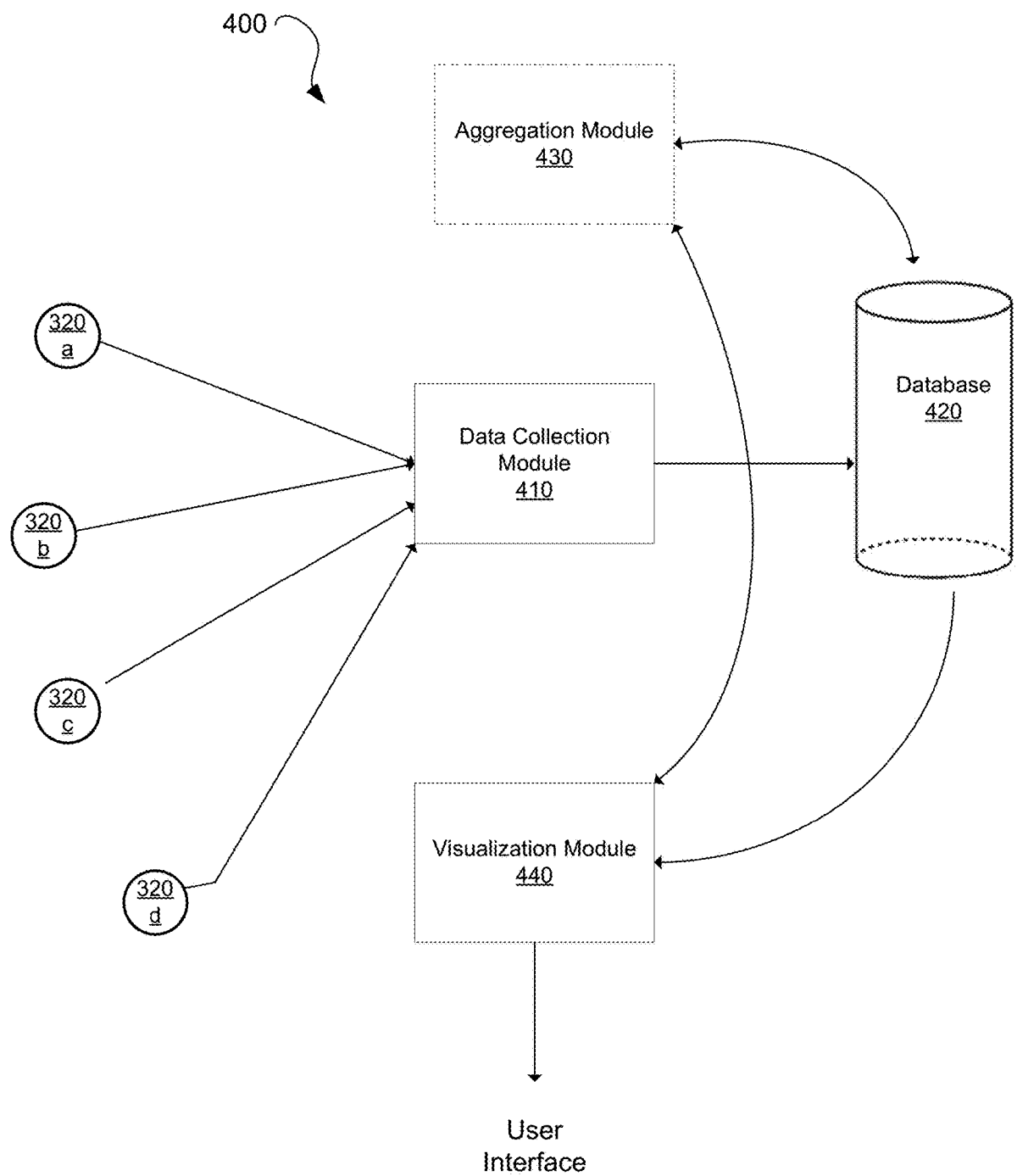
FIG. 4 depicts an exemplary processing system.

Although FIG. 4 depicts three modules, fewer or more modules may be included in the processing system 400. Additionally, the various modules may be combined into a single module. For example, some of the aggregation may be performed on-demand in the visualization module 440, such as when a user selects an aggregate classification to be displayed. Parts of the visualization module 440 may operate in a user's web browser. Further, there can be multiple instances of visualization module 440, as multiple users can use the processing system 400 at the same time. The modules may be hardware components with one or more processors that execute instructions or software to implement the various functions described herein.

Figures 3B, 3C, 3D:
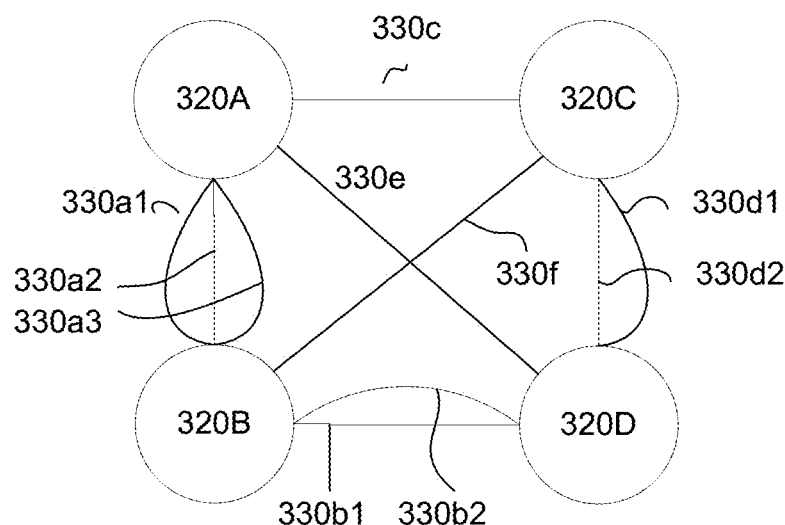
FIG. 3B depicts an exemplary embodiment of four network nodes in communication with each other.
FIG. 3C depicts a table showing that four devices present in an exemplary network.
FIG. 3D depicts a table showing the device connection paths that are present in the exemplary network.

FIG. 3B depicts an exemplary embodiment of four network nodes in communication with each other. While four network nodes are depicted here for this example, any number of nodes may be present in the communications network. In the exemplary embodiment of FIG. 3B, nodes 320A-320D are network devices. Each device has one or more paths or tunnels connecting it to every other device. For example, there are three tunnels connecting device 320A with 320B, and these are shown as 330a1, 330a2 and 330a3. Similarly, there are two tunnels connecting device 320B with 320D, and these are shown as 330b1 and 330b2. The exemplary embodiment of FIG. 3B also depicts one path or tunnel connecting device 320A with 320C, shown as 330c. Two paths or tunnels connect device 320C with device 320D, shown as 330d1 and 330d2. One path or tunnel connects device 320A with device 320D, shown as 330e. One path or tunnel connects device 320C with device 320B, shown as 330f. While only a few paths or tunnels are depicted here, there can be a multitude of paths or tunnels between each device. Furthermore, in some parts of this disclosure, the terms tunnel and path may be used synonymously.

FIG. 3C depicts a table showing that four devices are present in the exemplary network of FIG. 3B. FIG. 3D depicts a table showing the device pairs that are present in the exemplary network of FIG. 3B. Some metrics (such as loss and jitter) can be measured separately for each direction of data flow, i.e. 320A→320B or 320B→320A.

FIGS. 3E-3G are tables depicting how network characteristics may be classified for different levels of the network, based on the same set of underlying statistical data collected regarding network characteristics. FIG. 3E is a partial table depicting some exemplary network characteristics for some tunnels in the network of FIG. 3B. For example, FIG. 3E shows that for the device pair of 320A-320B, there are three tunnels: 330a1, 330a2, and 330a3. The network characteristic for tunnel 330a1 is classified as "G" or "green" on Monday, Tuesday, and Wednesday. The network characteristic for tunnel 330a2 is classified "G" for Monday and Tuesday, but as "Y" or "yellow" for Wednesday. The network characteristic for tunnel 330a3 is classified as "G" for Monday and Wednesday, but as "R" or "red" for Tuesday.

FIG. 3F is a table depicting a second classification, also sometimes referred to herein as an aggregate classification, that is applied to the set of first classifications from FIG. 3E. As discussed herein, any rule set can be used with thresholds for generating the second classifications. For example, a rule set may be applied stating that if any characteristic is classified as "R" in the group, then an aggregate second classification should be "R". If any characteristic is classified as "Y" and there is no "R" in the group, then an aggregate second classification should be "Y". Applying this rule set to the table of FIG. 3E yields an exemplary set of classifications for each device pair, depicted in FIG. 3F.

For device pair 320A-320B, all three tunnels were "G" on Monday, thus yielding a second classification of "G" for all paths connecting the device pair. On Tuesday, two tunnels were "G" and one was "R", thus the second classification is "R" for all paths connecting the device pair. On Wednesday two tunnels were "G" and one was "Y", thus the second classification is "Y" for all paths connecting device pair 320A-320B. A similar analysis can be performed for every path in the network to derive an aggregate classification for each device pair.

From the classification of each device pair, the data may be aggregated once more to derive a classification for each device, as depicted in the exemplary table of FIG. 3G. In an exemplary embodiment, the classification for every device pair including device 320A is considered to derive an aggregate classification for device 320A. While exemplary table 3F only depicts device pair 320A-320B, device 320A is also part of the pair 320A-320C and 320A-320D in the exemplary network of FIG. 3B.

Since exemplary table 3F is a partial table, device 320A only appears on one row. Thus, the classifications on that row are applicable to device 320A, i.e. "G" on Monday, "R" on Tuesday and "Y" on Wednesday. For exemplary purposes, it is assumed that all other pairings not shown in table 3F are classified as "G".

In table 3F, device 320B appears on two rows, as being a part of two device pairings. However, while not depicted in the exemplary table 3F for brevity's sake, device 320B is also part of pairing 320B-320C in the exemplary network of FIG. 3B. Data from each pairing is aggregated to derive a classification for the device. As discussed herein, any rule set defining any set of thresholds may be applied to arrive at this classification.

For exemplary purposes, a similar rule set applied to FIG. 3F is depicted as being applied to FIG. 3G, with the assumption that all pairings not depicted in table 3F are classified as "G". Thus, on Monday, both device pairings including device B are classified as "G", and it is assumed that all other device pairings including device B that are not depicted are also classified as "G". Therefore, the aggregate classification for device 320B is "G". On Tuesday, one path containing device 320B is "R" while the other is "G". Since there is at least one "R", device 320B is classified as "R". On Wednesday, one path containing device 320B is "Y" while the other is "G". Since there is at least one "Y" and no "R", device 320B is classified as "Y" for the day.

Figure 7:
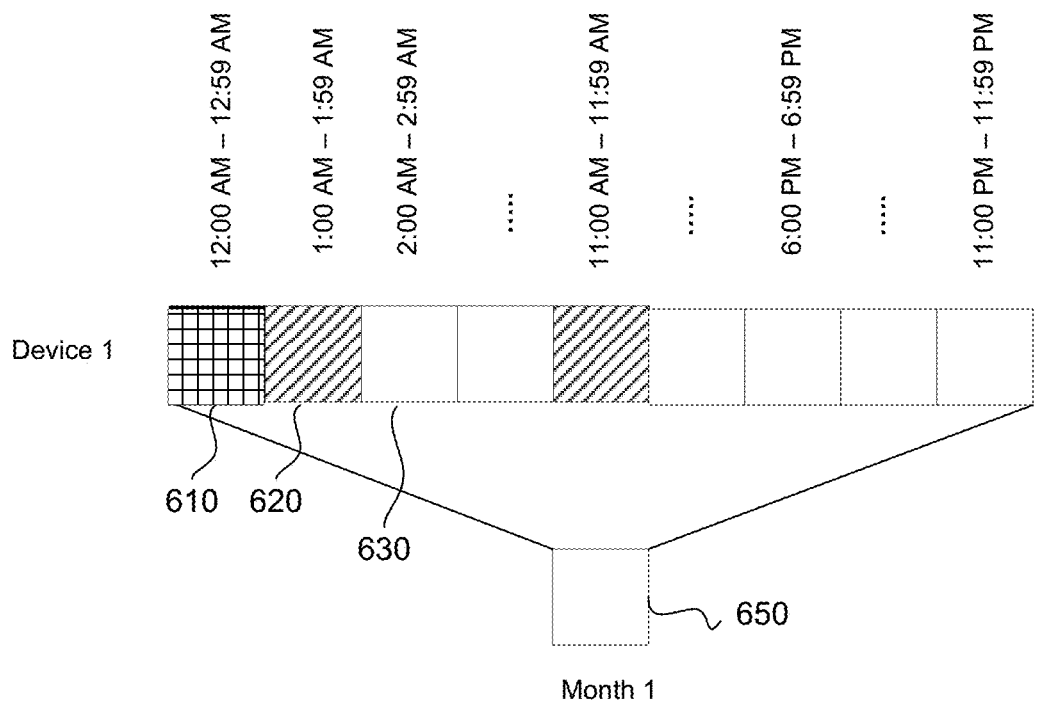
FIG. 7 represents another exemplary aggregate classification determination for a device.

In this way, multiple levels of classifications may be generated. Network characteristic data can be aggregated by characteristic (such as combining loss and jitter), as shown in FIGS. 13A-13C. Also, network characteristic data can be aggregated by paths, node pairs, and nodes as shown in FIGS. 3E-3G. Further, network characteristics can be aggregated by time, as shown in FIGS. 5-7. This allows for reams of data regarding network performance to be distilled and simplified into one visually representative color or pattern that is displayed to a network administrator.

As will be understood by persons of ordinary skill in the art, different classifications will result for the same network entity if a different rule set or thresholds are applied to the same data.

FIGS. 13A-13C depict an exemplary method for deriving an aggregate classification for two network characteristics. While only two network characteristics are aggregated in the exemplary figures, any number of characteristics can be aggregated.

FIG. 13A depicts an exemplary table showing classifications for the loss network characteristic for devices 1-4 over days 1-4. FIG. 13B depicts an exemplary table showing classifications for the jitter network characteristic for the same devices 1-4 over days 1-4. While four devices are shown here, any number of devices, paths, tunnels, etc. can be compared, as discussed herein. Furthermore, while days 1-4 are depicted here, any length of time can be compared in a similar manner.

FIG. 13C depicts an exemplary aggregate classification for the loss and jitter characteristic combined. Such an aggregate classification can be generated when a network administrator is interested in evaluating both of these network characteristics at the same time for the network devices. The aggregate classification can be generated by applying a rule set with defined thresholds. Any number of rule sets of thresholds can be applied. In the exemplary embodiment of FIG. 13C, a rule set is applied that the aggregate classification is the worst level classification present.

For example, device 1 is "G" on day 1 for both loss and jitter, and thus the aggregate classification is "G" for day 1 in FIG. 13C. Device 1 is "G" on day 2 for loss but "R" on day 2 for jitter. Thus, the aggregate classification for device 1 on day 2 is "R", since that is the worst level of classification present. Device 1 is "R" for loss on day 3 and "G" for jitter on day 3. The aggregate classification on day 3 for device 1 is "R", since that is the worst level of classification present. Device 1 is "G" again on day 4 for both loss and jitter, so the aggregation classification is "G" for that day in FIG. 13C. In this way, each device can be compared for each day to generate the aggregate classifications shown in FIG. 13C.

FIG. 5A depicts an exemplary embodiment for a network health characteristic for device 1. At 2:00 pm, box 510 shows that there is insufficient data for this characteristic for this device at this time. At 2:01 pm, box 520 shows that device 1 is classified as 'warning' for this characteristic. At 2:02 pm, box 530 shows that device 1 is classified as 'good' for this characteristic. Similarly, each minute's data for this characteristic for device 1 can be assigned a classification. Each minute's data can then be aggregated into one classification for a different time period using various rule sets and thresholds. In FIG. 5A, one aggregate classification is presented in box 540 to represent the network health characteristic for device 1 for the entire time span from 2-3 pm. Any number of rule sets or thresholds can be applied to determine the aggregate classification. In FIG. 5A, a rule set is applied that if any time period within the hour has insufficient data, then the entire hour is classified as insufficient data, thus making box 540 an aggregate classification of insufficient data.

Figure 5B:
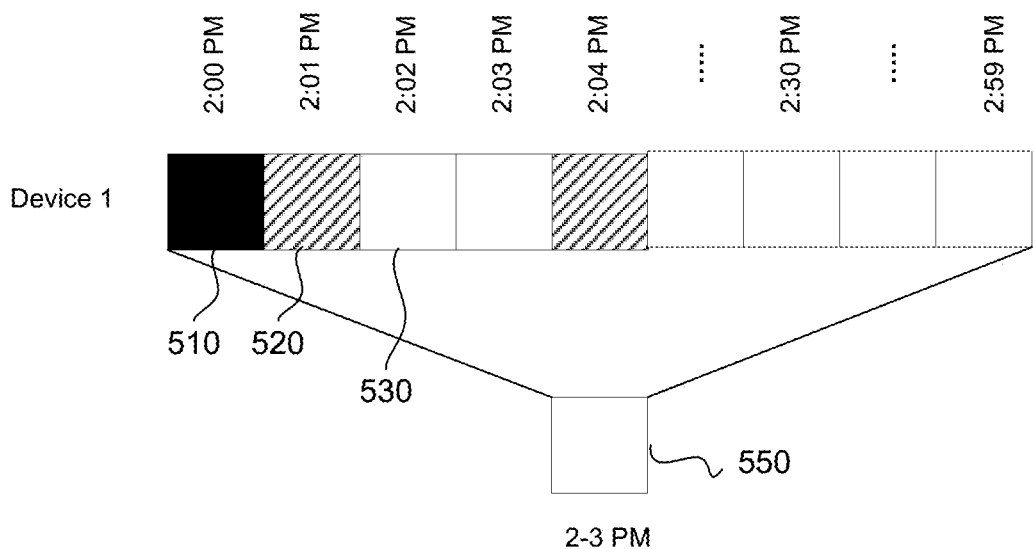
FIG. 5B depicts another exemplary embodiment for a network health characteristic for a device.

In FIG. 5B a rule set is applied that the majority of minutes are classified as 'good', then the aggregate classification is also 'good', thus making the aggregate classification in box 550 for device 1 as 'good' for the time span from 2-3 pm. As known to a person of ordinary skill in the art, any number of rule sets may be applied to determine the aggregate classification.

In various embodiments, a classification of 'bad' may be considered an impaired minute for the network component since that network component is not operating as it should. By classifying network health characteristics for each minute, a network administrator can quickly view a number of impaired minutes for each network component. Similarly, for different time periods an administrator can view impaired time (such as hours, days, months, etc.). A number of impaired minutes can be counted in each week, month, or for any desired time segment. An "impaired" minute can be defined as any minute that is classified as 'bad', classified as 'bad' or 'warning', classified as 'bad', 'warning' or 'not applicable', or any other definition may be applied to determine an "impaired" minute of performance. Impaired minutes are further discussed with reference to FIG. 9.

Similarly, other classifications of minutes can be counted. For example, all minutes classified as 'good', may be considered good minutes, and the number of 'good' minutes in a time period may be counted. In other embodiments, minutes classified as 'warning' may be determined to represent "marginal" performance for a network component, and the number of "marginal" minutes of performance over a time period may be counted. In this way, any classification of minutes can be summed.

FIG. 6 represents an exemplary aggregate classification determination for device 1 for a network health characteristic over a different time span. Box 610 shows that from 12:00 am-12:59 am, the network health characteristic for device 1 was classified as 'bad'. From 1:00 am-1:59 am, the network health characteristic for device 1 was classified as 'warning' in box 620. From 2:00 am-2:59 am, the network health characteristic for device 1 was classified as 'good' in box 630. A rule set may be applied to the individual classifications for each hour of a day to determine an aggregate classification for the day for the characteristic for device 1. Box 640 shows that an aggregate classification over the day is determined to be 'bad'. In this embodiment, a rule set may be applied that if any classification is 'bad', then the aggregate classification is bad. Any number of rule sets may be applied to determine the aggregate classification.

FIG. 7 represents an exemplary aggregate classification determination for device 1 for a network health characteristic over another time span. From the same hourly classifications of boxes 610, 620, and 630 of FIG. 6, data may be aggregated on a monthly basis. An aggregate classification for the month 650 may be determined by applying a rule set to the individual classifications for each hour, for the network health characteristic for device 1. In exemplary FIG. 7, a rule set may be applied that if the majority of hours are 'good', then the aggregate classification is 'good'. Although hierarchical aggregation is displayed here, it is clear that the monthly classification can be derived directly from minute or hourly data. Similarly, an aggregate classification can be derived from data for any discrete time period.

Figure 8:
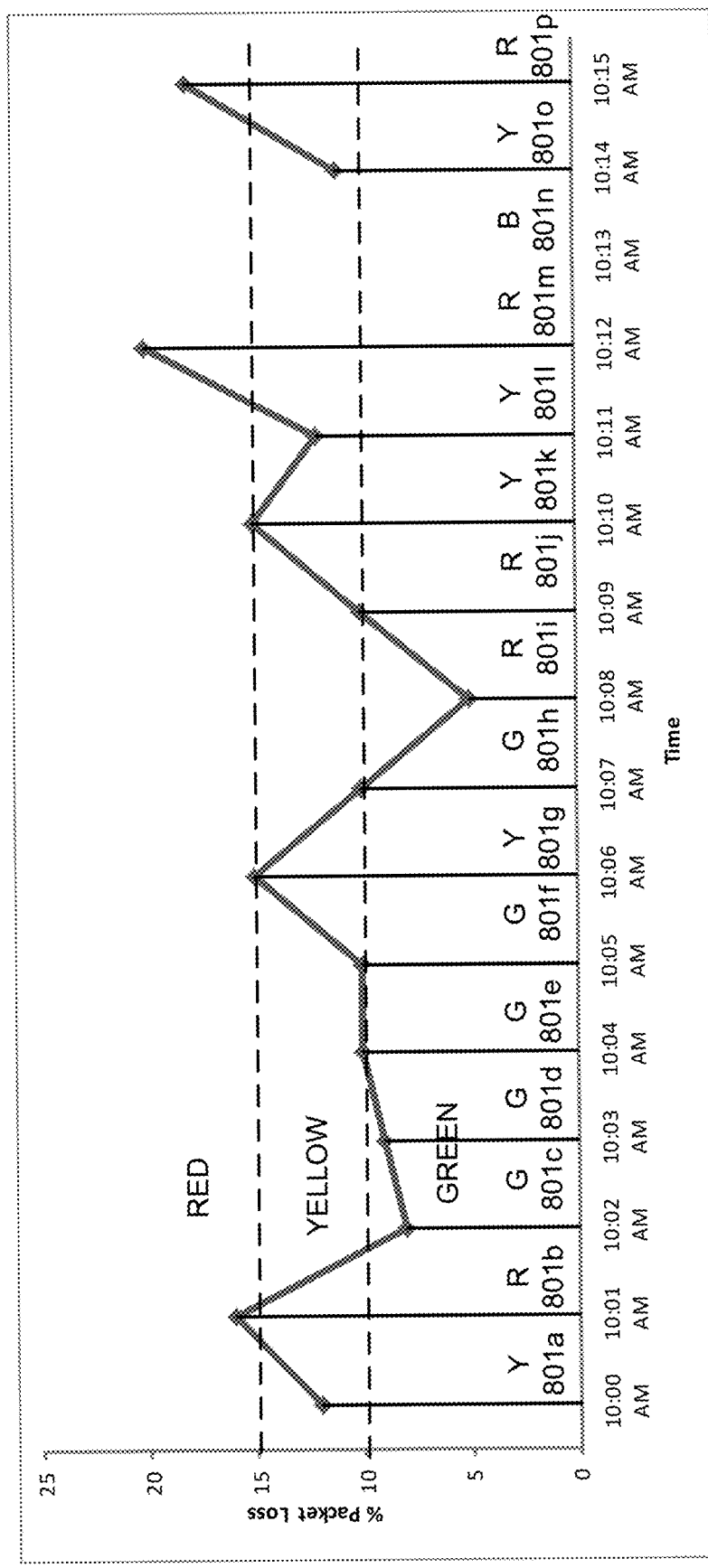
FIG. 8 represents an exemplary time series plot.

In various embodiments, data collected from each network component is collected on a minute basis. The collected data may be visually represented on a time series plot 800. The exemplary time series plot in FIG. 8 depicts a network health characteristic, percentage of packet loss, for a network component for each minute from 10:00 am to 10:15 am. Thresholds are applied to classify this data into green, yellow, and red categories representing 'good', 'warning', and 'bad' classifications. As discussed herein, although three categories are depicted in plot 800, any number of categories may be determined from the data. In this example, lower packet loss is better, so the lower values are classified as green, whereas the higher values are classified as red. For a different network health characteristic, higher values may be classified as green and lower values as red.

FIG. 8 shows that a packet loss of 10% or less is classified as green, a packet loss of 11-15% is classified as yellow, and a packet loss of 16% or more is classified as red. In one embodiment, a rule set may be applied to this time series plot 800 to determine a classification for the network component for the entire time period from 10:00 am-10:15 am. For example, a rule set may be that if any data point is over the 'red' threshold, then the classification is 'red' for this time period. FIG. 8 also shows that no packet loss data is available for this network component at 10:13 am. Thus, another rule set may be that if any data point is missing over the entire time period, then the classification for the time period is 'black'. In this way, numerical data for an entire time period can be represented simply by one classification.

In various embodiments, individual minute data may be referred to as segments over the time period. Thus, one segment for the time period 10:00-10:15 am may be the time period from 10:00-10:01 am. In this characterization, 15 segments are present over the time period from 10:00-10:15 am depicted in FIG. 8.

In other embodiments, each minute's data may be classified first using a first rule set. FIG. 8 depicts 801*a* classifying data for 10:00 am as 'Y' since the data point for 10:00 am falls within the yellow range. 801*b* is a classification of 'R' since the data point for 10:01 am is in the red range. 801*c* is a classification of 'G' since the data point for 10:02 am is in the green range. In this way, each minute's data point is converted from its actual value into a classification, as shown in exemplary classifications 801*a*-801*p* in FIG. 8. In exemplary embodiments, once the data is converted from a numerical value into a classification, the original numerical value data is no longer necessary for evaluating the health characteristic for this network component.

A second rule set can then be applied to classifications 801a-801p to derive an aggregate classification to view packet loss performance for this network component over a broader time period, using a methodology discussed above with respect to FIGS. 5-7.

In other embodiments, a different methodology may be applied to each minute's data to arrive at an aggregate classification. The number of each type of classification may be counted. For example, from the time period 10:00-10:15 am in FIG. 8, there are a total of 5 red minutes, 1 black minute, 5 yellow minutes, and 5 green minutes. An aggregate classification may be determined by counting the number of minutes in each category, as explained further with reference to FIG. 9.

Figure 9:
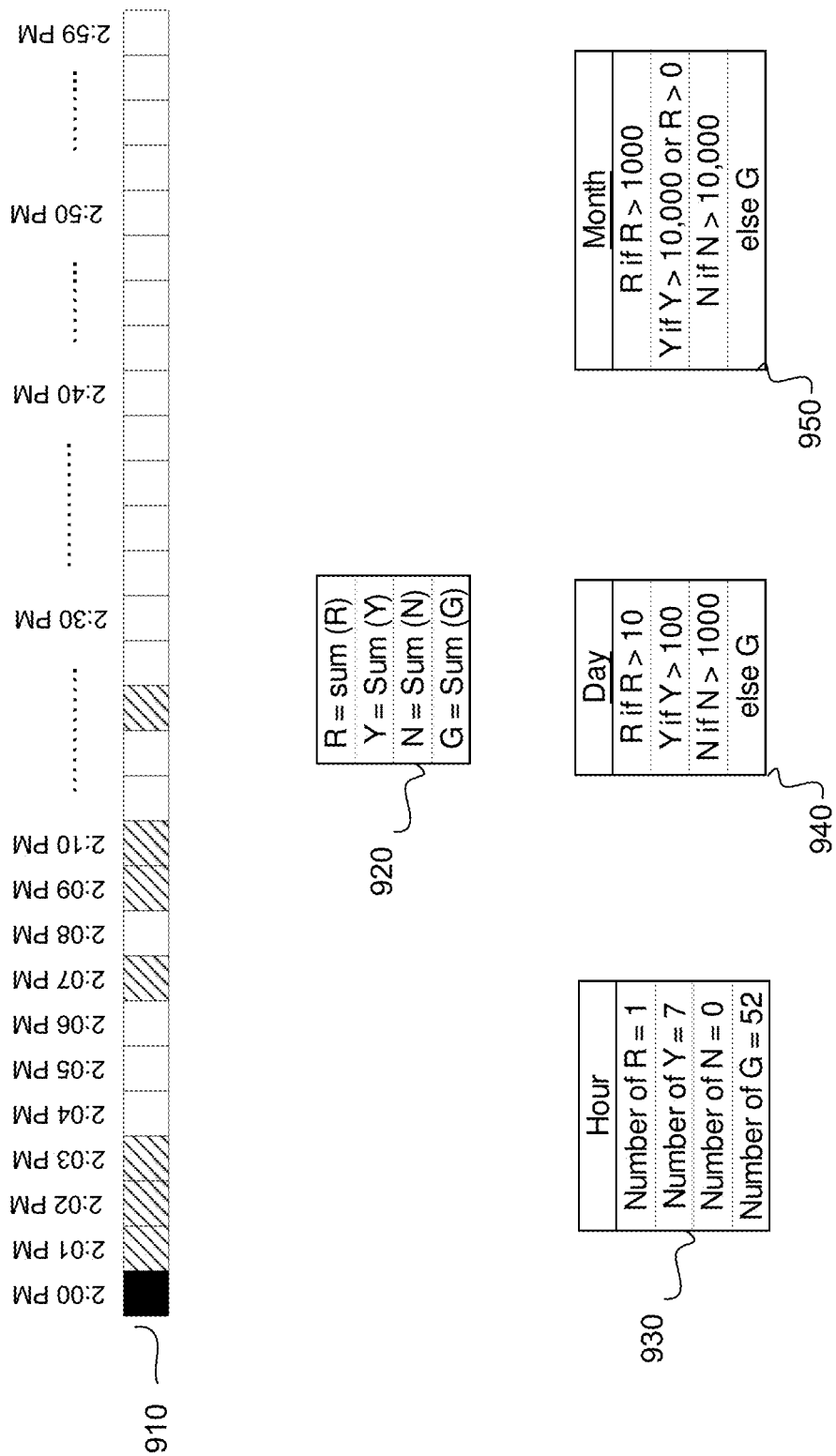
FIG. 9 represents an exemplary method for summing classification minutes.

FIG. 9 depicts an exemplary methodology for determining a number of impaired minutes for a network component. A number of impaired minutes can be determined for a specific device, connection pair, tunnel or path, or other any network component being classified. In graph 910 of the exemplary embodiment depicted in FIG. 9, a classification for one or more network health characteristics is depicted graphically from 2:00 PM to 2:59 PM. The number of each type of classification can be summed for a day, week, month, or any time period, to arrive at an aggregate classification. For example, box 920 shows that the number of each type of classification is summed over the time period.

Table 930 shows each classification is summed for the hour depicted in graph 910. For example, table 930 shows that for the hour from 2:00 PM to 2:59 PM, there is one red minute (2:00 PM in graph 910), there are 7 yellow minutes, 52 green minutes, and 0 minutes classified as not applicable. From the first classifications depicted in graph 910, aggregate classifications can be determined for different time periods by applying a rule set to the summed data in table 930. As will be appreciated by persons of ordinary skill in the art, a number of different rule sets can be applied to the summed classifications to determine an aggregate classification.

Table 940 depicts an exemplary rule set applied to data over a day. Minute data for a whole day can be summed as in box 920 to determine a single aggregate classification depicting the performance of the network component for the day. In one day, there are 1,440 minutes (60 minutes/hour× 24 hours/day=1,440 minutes/day), and thus 1,440 classifications can be determined for the performance of one or more network health characteristics for a network component over the day. That is, each of the 1,440 minutes can be classified as R, Y, G or N (or other designated classifications). The number of each type of classification can be summed for the day, and then a rule set such as the one depicted in table 940 can be applied to determine a single aggregate classification for the day. For example, if there are more than 10 R minutes in the day, then the aggregate classification for the day is R. If there are less than 10 R minutes but more than 100 Y minutes, then the aggregate classification for the day is Y. If there are over 1,000 N minutes for the day, then aggregate classification for the day is N. Otherwise, if none of the prior rules is true, then the day is classified as G. In this way, outlier data can be smoothed and a more accurate picture of network performance may be determined. Further, in this way 1,440 data points can be synthesized down to a single data point, for ease of analysis of a network component's performance.

Table 950 depicts an exemplary rule set applied to data over a month. Minute data for a whole month can be summed as in box 920 to determine a single aggregate classification depicting the performance of the network component for the month. In a 30-day month, there are 43,200 minutes (60 minutes/hour×24 hours/day×30 days/ month=43,200 minutes/month). Thus, 43,200 classifications can be determined for the performance of one or more network health characteristics for a network component over the month. That is, each of the 43,200 minutes can be classified as R, Y, G or N (or other designated classifications). The number of each type of classification can be summed for the month, and then a rule set such as the one depicted in table 950 can be applied to determine a single aggregate classification for the month. For example, if there are more than 1000 R minutes in the month, then the aggregate classification for the month is R. If there are any R minutes or more than 10,000 Y minutes, then the aggregate classification for the month is Y. If there are over 10,000 N minutes for the month, then the aggregate classification for the month is N. Otherwise, if none of the prior rules is true, then the month is classified as G. In this way, outlier data can be smoothed and a more accurate picture of network performance may be determined. For example, a network administrator may decide that if a single minute out of 43,200 minutes is red, then the whole month should not be classified as red or 'bad' performance. Further, in this way 43,200 data points can be synthesized down to a single data point, for ease of analysis of a network component's performance.

Using the methodology described above, a number of impaired minutes can be determined for an hour, day, month, or any other time period. Any number of rule sets may be applied to classify a minute as "impaired". For example, a minute can be impaired if it is R or if it is R or Y. Determining a number of impaired minutes, impaired days, impaired months, or any other time segment, can aid in the analysis of network performance for a network component.

Figure 10:
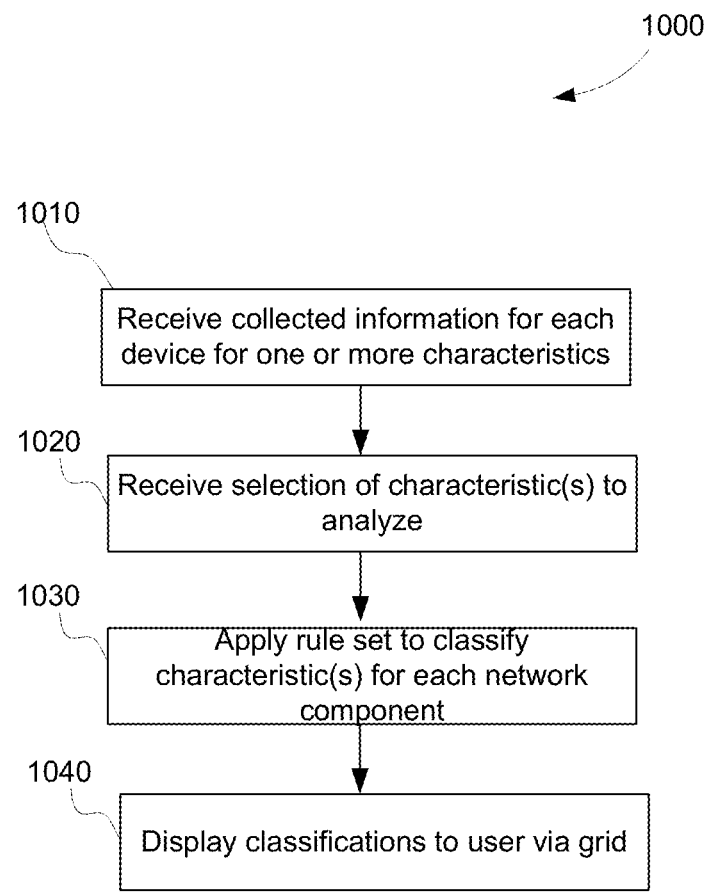
FIG. 10 depicts an exemplary method for dynamically displaying network health characteristics of a plurality of network components on a communications network via a graphical user interface.

FIG. 10 depicts an exemplary method 1000 for dynamically displaying network health characteristics of a plurality of network components on a communications network via a graphical user interface. In step 1010, collected information regarding one or more network health characteristics for each of the network components is received. In step 1020, a selection is received from a user regarding one or more network health characteristics to be evaluated from the plurality of network health characteristics received and stored. In exemplary embodiments, this selection may be received via a GUI similar to GUI 200 of FIG. 2. In step 1030 a rule set defining at least one threshold is applied to the collected information to assign a classification to the selected network health characteristic(s) for each of the network components over a set time period. The time period may be selected by the user or may be automatically selected. In step 1040 the classification for each network component is displayed to the user via a grid format on an interactive graphical user interface.

Figure 11:
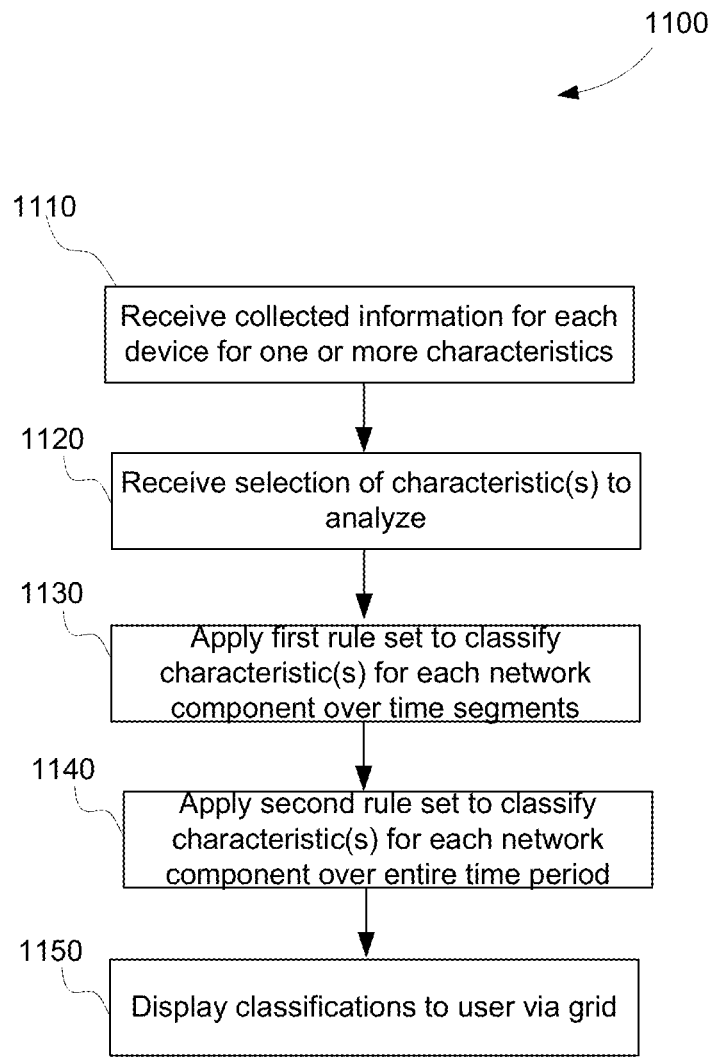
FIG. 11 depicts another exemplary method for dynamically displaying network health characteristics of a plurality of network components on a communications network via a graphical user interface.

FIG. 11 depicts another exemplary method 1100 for dynamically displaying network health characteristics of a plurality of network components on a communications network via a graphical user interface. In step 1110, collected information regarding one or more network health characteristics for each of the network components is received. In step 1120, a selection is received from a user regarding one or more network health characteristic to be evaluated from the plurality of network health characteristics received and stored. In exemplary embodiments, this selection may be received via a GUI similar to GUI 200 of FIG. 2. In step 1130 a rule set defining at least one threshold is applied to the collected information to assign a classification to the selected network health characteristic for each of the network components for each individual segment of time within the time period of the collected information. The time period may be selected by the user or may be automatically selected. The segments of time may be selected by the user or may be automatically selected. In step 1140 a second rule set defining at least one threshold is applied to each of the first classifications for each segment of time to assign a second classification to the selected health characteristic(s) for each of the plurality of network components over the entire first period of time. The second classification is an aggregate classification, similar to that discussed above in reference to FIGS. 5-7 or FIG. 9. In step 1150 the second classification for each network component is displayed to the user via a grid format on an interactive graphical user interface.

Figure 12:
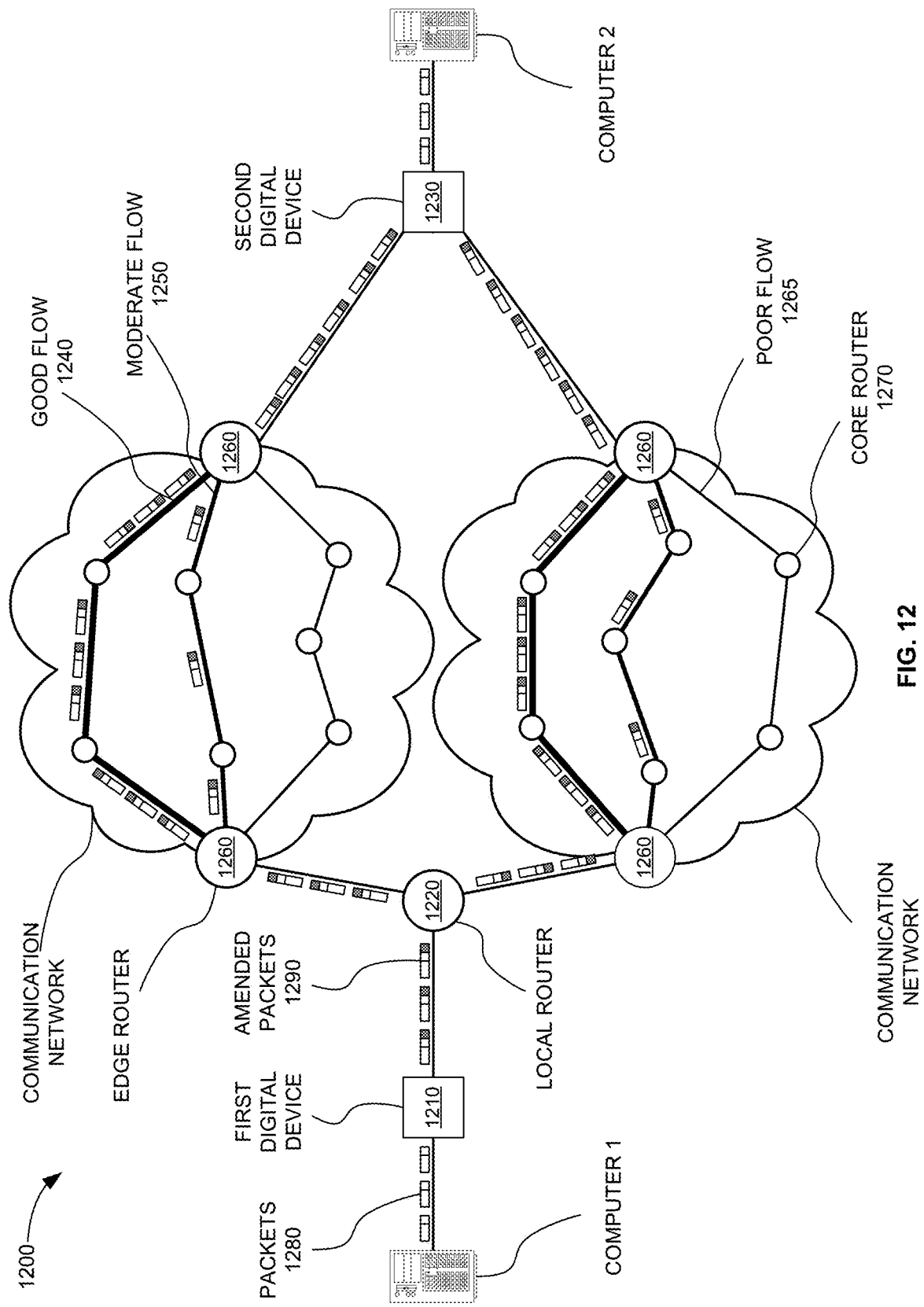
FIG. 12 illustrates an exemplary implementation of a network service using multiple flows over a communications network.

FIG. 12 illustrates an exemplary implementation of a network service using multiple flows over a communications network. An environment 1200, as depicted in FIG. 12, may include certain similar elements as the network 300 discussed herein. Environment 1200 may comprise computers, a communication network, as well as the various routers (e.g., the local routers 1220, the edge routers 1260, and the core routers 1270). The environment 1200 also includes the first digital device 1210, which is positioned between computer 1 and one of the local routers 1220, and the second digital device 1230, which is positioned between computer 2 and the edge routers 1260.

In some embodiments, the first digital device 1210 may amend the packets 1280 received from computer 1 via one or more inter-computer flows to affect which network flow the packet is directed to, this resulting in an amended packet 1290. According to one embodiment, the packet 1280 is amended such that an additional header portion is added to the packet, while according to another embodiment, the packet 1280 is amended such that certain information in the header portion is altered or replaced. The amended packet 1290 may be restored to the packet 1280 upon receipt by the second digital device 1230. After which, the packet 1280 may be delivered to computer 2 on the inter-computer flow from which it originated. It is noted that the first digital device 1210 may be equivalent to, and interchangeable with, the second digital device 1230 in that any task or procedure carried out by the first digital device 1210 may be carried out by the second digital device 1230, and vice versa.

As shown in FIG. 12, the amended packets 1290 may advantageously be more heavily distributed to the flows having preferable flow metrics (e.g., the good flow 1240). The moderate flow 1250 may transfer less of the amended packets 1290, while the poor flow 1265 may transfer even fewer. Network health characteristics of each of these flows may be measured and tracked via the processing system 400, for visualization and display to a network administrator via the grid platform discussed herein. Additional information regarding how network health characteristics can be measured and tracked can be found in U.S. Pat. No. 8,743,683 issued Jun. 3, 2014 entitled "Quality of Service Using Multiple Flows", which is incorporated herein by reference in its entirety.

Thus, methods and systems for a visualization platform for the dynamic monitoring of network devices deployed in a communication network are disclosed. Although embodiments have been described with reference to specific example embodiments, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A computer-implemented method for dynamically monitoring and displaying network performance of a plurality of network devices in a communications network via an interactive graphical user interface, the method comprising:
   receiving a plurality of collected metrics regarding at least one health characteristic for a plurality of network paths over a first period of time, each network path comprising a first network device at a first terminal end of the network path and a second network device at a second terminal end of the network path from the plurality of network devices in the communications network;
   receiving a selection from a user of a health characteristic from the at least one health characteristic to analyze for a second period of time, wherein the second period of time is a multiple of the first period of time;
   applying a first rule set defining at least one threshold to assign an aggregate first classification for each first network device and second network device pair associated with the plurality of network paths over the second period of time; and
   displaying to the user the aggregate first classification for each first network device and second network device pair via a selectable object on an interactive graphical user interface, wherein one selectable object of the interactive graphical user interface represents an aggregate network performance for all network paths utilizing the first network device and second network device pair, based on the collected metrics for the plurality of network paths over the first period of time.

2. The computer-implemented method of claim 1, wherein, upon selection of the object by the user, a selectable object on the interactive graphical user interface is configured to display additional information regarding network performance for the first network device and second network device pair.

3. The computer-implemented method of claim 1, wherein, upon selection of the object by the user, a selectable object associated with the first network device on the interactive graphical user interface is configured to display a histogram or time series plot displaying the collected metrics for the plurality of network paths associated with the first network device and second network device pair.

4. The computer-implemented method of claim 1, wherein the first period of time is selected by the user.

5. The computer-implemented method of claim 1, wherein the aggregate first classification is a qualitative classification.

6. The computer-implemented method of claim 5, wherein at least one threshold to assign the aggregate first classification is determined by the user.

7. The computer-implemented method of claim 1, wherein the plurality of collected metrics regarding at least one health characteristic includes at least one of network delay, lost packets, out of order packets, and jitter.

8. The computer-implemented method of claim 1, wherein the interactive graphical user interface is a grid shape, and the selectable object on the interactive graphical user interface is a square on the grid shape.

9. The computer-implemented method of claim 1, wherein the collected metrics are received in real-time.

10. The computer-implemented method of claim 1, further comprising applying a second rule set defining at least one threshold to assign an aggregate second classification for each network device over the second period of time, the aggregate second classification comprising an aggregate classification for each network device associated with the first network device and second network device pairs and a corresponding plurality of network paths for each first network device and second network device pair; and displaying to the user the aggregate second classification for each network device on the interactive graphical user interface.

11. The computer-implemented method of claim 10, wherein, upon selection of the object by the user, a selectable object associated with the first network device and second network device pair on the interactive graphical user interface is configured to display a second interactive graphical user interface displaying the aggregate second classifications for network device pairs associated with the first network device.

12. The computer-implemented method of claim 10, wherein the aggregate second classification is a qualitative classification.

13. A non-transitory computer readable medium storing instructions for executing a method performed by a computer processor to dynamically monitor and display network performance of a plurality of network devices in a communications network via an interactive graphical user interface, the method comprising:
receiving a plurality of collected metrics regarding at least one health characteristic for a plurality of network paths, each network path comprising a first network device at a first terminal end of the network path and a second network device at a second terminal end of the network path from the plurality of network devices in the communications network;
receive a selection from a user of a health characteristic from the at least one health characteristic to analyze for a second period of time, wherein the second period of time is a multiple of the first period of time;
applying a first rule set defining at least one threshold to assign an aggregate first classification for each first network device and second network device pair associated with each network path over the second period of time;
displaying to the user the aggregate first classification for each first network device and second network device pair via a selectable object on an interactive graphical user interface, wherein one selectable object of the interactive graphical user interface represents an aggregate network performance for all network paths utilizing the first network device and second network device pair, based on the collected metrics for the plurality of network paths over a first period of time.

14. The non-transitory computer readable medium of claim 13, wherein the aggregate first classification and the aggregate second classification are qualitative classifications.

15. The non-transitory computer readable medium of claim 13, wherein the plurality of collected metrics regarding at least one health characteristic includes at least one of network delay, lost packets, out of order packets, and jitter.

16. The non-transitory computer readable medium of claim 13, further comprising:
applying a second rule set defining at least one threshold to assign an aggregate second classification for each network device over the second period of time, the aggregate second classification comprising an aggregate classification for each network device associated with the first network device and second network device pairs and a corresponding plurality of network paths for each first network device and second network device pair; and
displaying to the user the aggregate second classification for each network device on the interactive graphical user interface.

17. A system for dynamically monitoring and displaying network performance of a plurality of network devices in a communications network via an interactive graphical user interface, the system comprising:
a network interface;
one or more data storage devices;
one or more processors communicably coupled to the network interface and the one or more data storage devices; and
a non-transitory computer-readable medium encoded with a computer program communicably coupled to the one or more processors to:
receive a plurality of collected metrics regarding at least one health characteristic for a plurality of network paths over a first period of time, each network path comprising a first network device at a first terminal end of the network path and a second network device at a second terminal end of the network path, from the plurality of network devices in the communications network;
receive a selection from a user of a health characteristic from the at least one health characteristic to analyze for a second period of time, wherein the second period of time is a multiple of the first period of time;
apply a first rule set defining at least one threshold to assign an aggregate first classification for each first network device and second network device pair associated with the plurality of network paths over the second period of time; and
display to the user the aggregate first classification for each first network device and second network device pair via a selectable object on an interactive graphical user interface, wherein one selectable object of the interactive graphical user interface represents an aggregate network performance for all network paths utilizing the first network device and second network device pair, based on the collected metrics for the plurality of network paths over the first period of time.

18. The system of claim 17, wherein the aggregate first classification is a qualitative classification.

19. The system of claim 17, wherein the plurality of collected metrics regarding at least one health characteristic includes at least one of network delay, lost packets, out of order packets, and jitter.

20. The system of claim 17, wherein the collected metrics are received in real-time.

* * * * *